S. A. CURRIN.
WHEEL FOR USE ON MOTOR VEHICLES.
APPLICATION FILED JAN. 3, 1914.
1,117,981.
Patented Nov. 24, 1914.
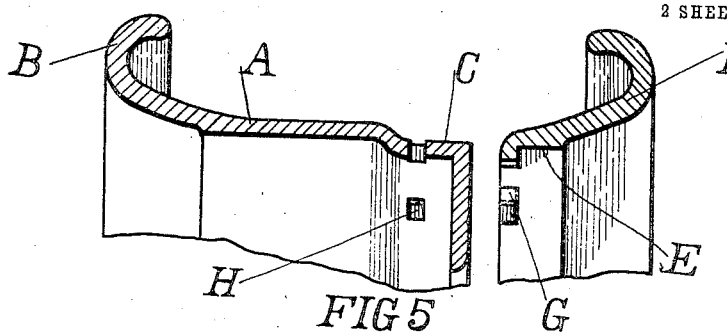
FIG 5
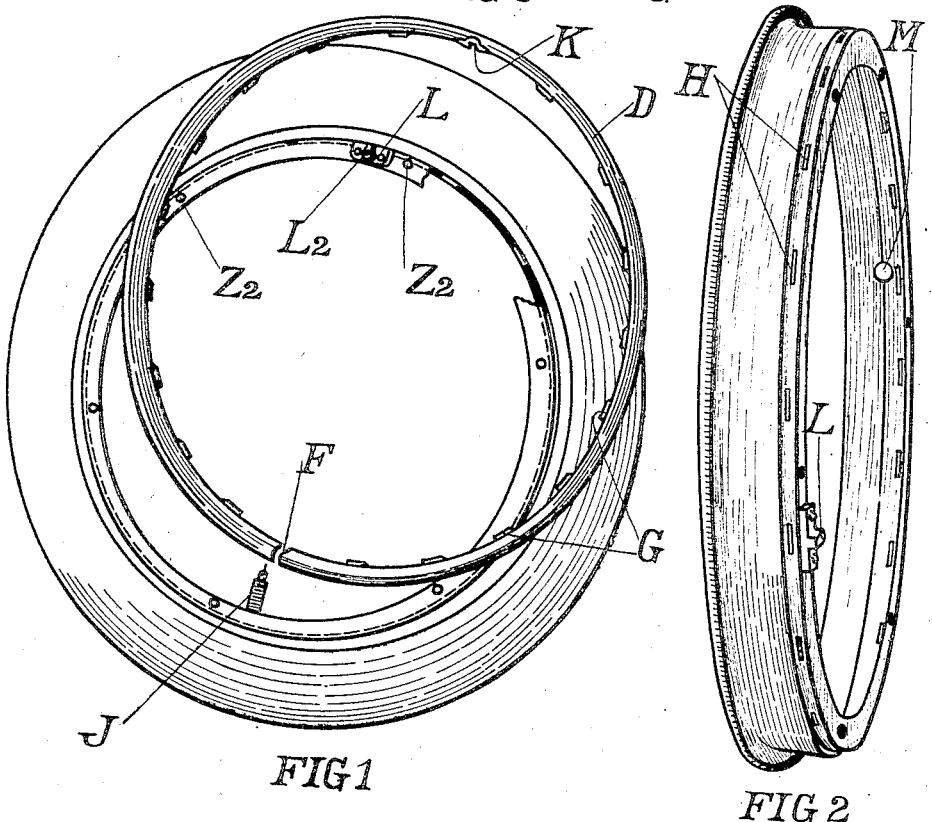
FIG 1
FIG 2
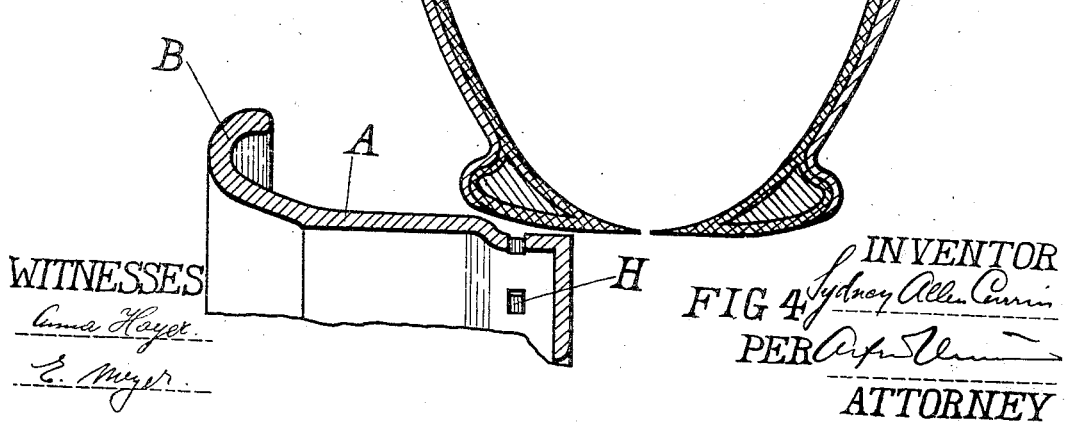
FIG 4
WITNESSES
INVENTOR
Sydney Allen Currin
PER
ATTORNEY

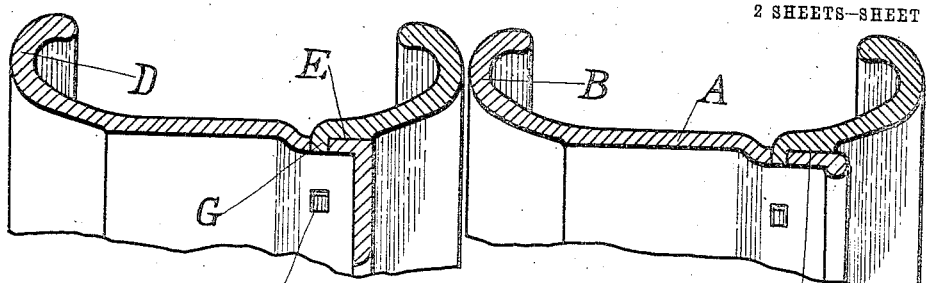
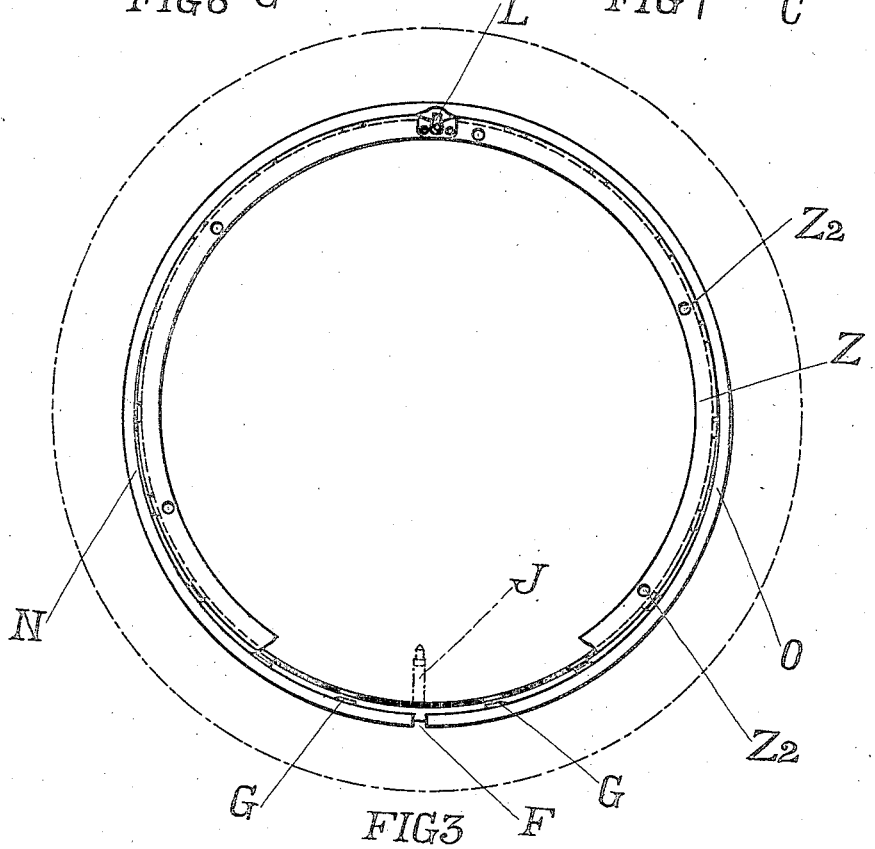
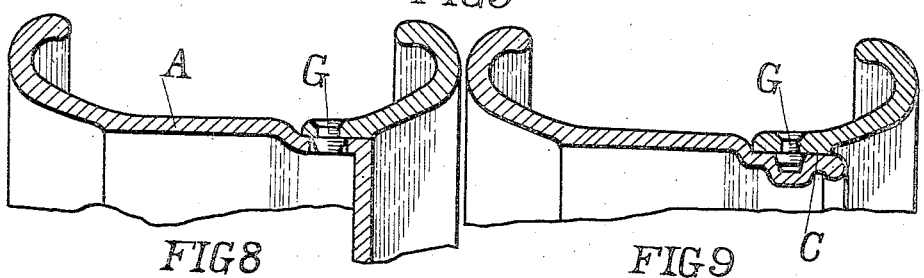

UNITED STATES PATENT OFFICE.

SYDNEY ALLEN CURRIN, OF BRISTOL, ENGLAND.

WHEEL FOR USE ON MOTOR-VEHICLES.

1,117,981.            Specification of Letters Patent.        Patented Nov. 24, 1914.

Application filed January 3, 1914. Serial No. 810,108.

*To all whom it may concern:*

Be it known that I, SYDNEY ALLEN CURRIN, a subject of the King of Great Britain, and resident of Bristol, in England, have invented certain new and useful Improvements in Wheels for Use on Motor-Vehicles, of which the following is a specification.

This invention relates to the wheels of motor vehicles and has for its object to provide a simple construction of divided wheel rim of the type in which one of the clench edges of the rim can be separated from the body of the rim so as to enable the tire to be pushed on to or off the body of the rim.

One of the chief drawbacks to existing rims of this kind is that when fitting the tire it has to be slipped straight on to the bed of the rim. As the interior of the tire beads is of about the same diameter as the bed of the rim this is difficult, but is overcome in the present case by means of a part of the rim of reduced diameter which forms, as it were, a step.

Further, the body of the rim is formed with slots near the dividing line and the separate clench comprises a ring split radially at one point and provided on its interior periphery with tongues or projections which drop into the slots, the clench being of a springy nature so that it can be sprung radially outward to disengage the tongues from the slots.

In the accompanying drawings, Figure 1 shows the application of the invention to a rim which is detachable from the wheel, the minor part of the divisible rim being shown separate. Fig. 2 is a perspective view of the major part of the divided rim. Fig. 3 is a face view of the parts shown in Fig. 1 with the detachable clench partially detached. Fig. 4 illustrates the method of attachment of the tire to the rim. Fig. 5 is a cross sectional view of part of the rim with the clench detached, while Fig. 6 is a corresponding view with the clench in position. Fig. 7 is a corresponding view showing the application of the invention to part of a wheel having a fixed rim. In this case a rim for a wire wheel is shown, but the invention is obviously applicable to rims for wood and steel wheels. Figs. 8 and 9 are cross sectional views of modifications.

Like letters indicate like parts throughout the drawings.

In each case the bed A of the rim is formed with a fixed clench B and a part C of reduced diameter, which forms the step referred to. These parts A B C form the major part of the divided rim. The detachable clench D constitutes the minor part and this is formed with a surface E which is adapted to seat upon the step C. The clench D is constituted by a ring of springy material split radially at F as is shown in Figs. 1 and 3. At its inner periphery it is provided with tongues G which engage holes or slots H in the step C, as will be clearly seen from Fig. 5, and these tongues are adapted to drop into the slots H and prevent separation of the rim parts.

By being of a springy nature the clench D can be sprung apart so as to separate the tongues from the slots.

An important feature is that the slot F is located opposite or close to either the tire valve J, see Fig. 3, or one of the security bolts, when the latter are used. Usually with this type of rim separate security bolts are dispensed with and a special known form of bolt valve is used which prevents creeping of the cover. This at the same time prevents separation of the ends F of the clench when the tire is deflated.

To insure the clench D being correctly replaced some locating means is desirable. For this purpose the clench may be formed with a notch as at K, Fig. 1, which is engaged by a tongue L, Figs. 2 and 3, which is arranged immediately opposite to the hole M through which the valve passes. Assuming that the wheel has been in use and that it is desired to remove the tire, this is first deflated and the valve slacked off so as to free the abutting ends F of the clench. The ends of the clench are then pushed radially outward into the position shown in Fig. 3 either by the hands or with the aid of a lever so that the tongues G near the ends F are disengaged from the slots. The clench tends to separate from the remainder of the rim at this point under the pressure of the tire so that these tongues do not tend to return to their slots. The parts of the clench farther away (as at N and O in Fig. 3) from the ends are then dealt with in the same way, until the detachable clench falls off the body of the rim. Replacement is effected by the reversal of the above process.

The major part of the rim is formed with a flange Z. In this flange are a number of holes $Z^2$ which are shown in Figs. 1 and 3, and through which screws may be passed to engage threads on the felly. To remove the rim from the wheel the screws are removed and the rim forced off the wheel. This is aided by inserting one of the screws in a screwed hole $L^2$ in a plate L shown particularly in Figs. 1 and 2. As the screw is tightened up it forces the rim off the wheel.

It is obviously not essential to this invention that the tongues G be integral with the clench B. As shown in Fig. 8 the tongues G may be riveted to the separate clench and may be circular or elongated, engaging corresponding holes in the major part A.

Alternatively, as shown in Fig. 9, instead of having holes in the major part the tongues or the equivalent G may engage recesses in the step C. In some cases this is preferable, particularly in the case of a wire wheel, and as it obviates any chance of water or foreign matter passing through into the tire space.

The employment of this invention does not add appreciably to the weight of the rim, while it enables the tire to be removed and replaced without the use of considerable strength.

What I claim as my invention, and desire to secure by Letters Patent of the United States is—

A wheel rim comprising a major part having a narrow step provided with recesses, a radially split minor part of spring-like material, forming a clench and having a narrow face adapted to seat on the narrow step of said major part and provided with a notch, projections extending from the narrow face of said minor part and adapted to enter the recesses in the narrow step of said major part, and a tongue on the said major part adapted to register with the notch in said minor part.

It testimony whereof I have signed my name to this specification in the presence of two subscribing witnesses.

SYDNEY ALLEN CURRIN.

Witnesses:
   E. J. FUSSELL,
   E. TYLER.